United States Patent
Nagy et al.

(10) Patent No.: US 6,232,260 B1
(45) Date of Patent: May 15, 2001

(54) SINGLE-SITE CATALYSTS FOR OLEFIN POLYMERIZATION

(75) Inventors: Sandor Nagy, Mason; Bradley P. Etherton, Cincinnati, both of OH (US); Ramesh Krishnamurti; John A. Tyrell, both of Williamsville, NY (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/417,510

(22) Filed: Oct. 14, 1999

(51) Int. Cl.$^7$ .................................................. B01J 31/18
(52) U.S. Cl. ..................... 502/155; 502/103; 502/117; 526/160; 526/161; 526/943
(58) Field of Search .................... 526/160, 161; 502/103, 117, 155

(56) References Cited

U.S. PATENT DOCUMENTS

| | | | |
|---|---|---|---|
| 4,752,597 | 6/1988 | Turner | 502/104 |
| 4,791,180 | 12/1988 | Turner | 526/160 |
| 5,153,157 | 10/1992 | Hlatky et al. | 502/117 |
| 5,198,401 | 3/1993 | Turner et al. | 502/155 |
| 5,241,025 | 8/1993 | Hlatky et al. | 526/129 |
| 5,539,124 | 7/1996 | Etherton et al. | 548/402 |
| 5,554,755 | 9/1996 | Krishnamurti et al. | 556/7 |
| 5,624,878 | 4/1997 | Devore et al. | 502/152 |
| 5,637,660 | 6/1997 | Nagy et al. | 526/160 |
| 5,902,866 | 5/1999 | Nagy et al. | 526/133 |

FOREIGN PATENT DOCUMENTS

WO 99/24446   5/1999   (WO) .

OTHER PUBLICATIONS

Herzog et al., *J. Am. Chem. Soc.* 118 (1996) 11988.
Mansel et al., *J. Organometal. Chem.* 512 (1996) 225.
Buu–Hoï et al., *J. Chem. Soc.* (1952) 2225.
March, *Advanced Organic Chemistry*, $2^{nd}$ ed. (1977) 1054.

*Primary Examiner*—David W. Wu
*Assistant Examiner*—Caixia Lu
(74) *Attorney, Agent, or Firm*—Jonathan L. Schuchardt

(57) ABSTRACT

A single-site olefin polymerization catalyst and method of making it are disclosed. The catalyst comprises an activator and an organometallic complex. The complex comprises a Group 3 to 10 transition or lanthanide metal, M, and at least one indenoindolyl ligand that is π-bonded to M. The key ligand is made in two steps from readily available indanones and aryl hydrazines. Reaction of its anion with a source of the metal completes a remarkably simple synthetic route to a new family of single-site olefin polymerization catalysts.

7 Claims, No Drawings

SINGLE-SITE CATALYSTS FOR OLEFIN POLYMERIZATION

FIELD OF THE INVENTION

The invention relates to catalysts useful for olefin polymerization. In particular, the invention relates to "single-site" catalysts that incorporate at least one indenoindolyl ligand.

BACKGROUND OF THE INVENTION

Interest in single-site (metallocene and non-metallocene) catalysts continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

While traditional metallocenes commonly include one or more cyclopentadienyl groups, many other ligands have been used. Putting substituents on the cyclopentadienyl ring, for example, changes the geometry and electronic character of the active site. Thus, a catalyst structure can be fine-tuned to give polymers with desirable properties. "Constrained geometry" or "open architecture" catalysts have been described (see, e.g., U.S. Pat. No. 5,624,878). Bridging ligands in these catalysts lock in a single, well-defined active site for olefin complexation and chain growth. Other bridged complexes are stereospecific catalysts for α-olefin polymerizations, providing a route to isotactic or syndiotactic polypropylene (see, for example, Herzog et al., *J. Am. Chem. Soc.* 118 (1996) 11988 and Mansel et al., *J. Organometal. Chem.* 512 (1996) 225).

Other known single-site catalysts replace cyclopentadienyl groups with one or more heteroatomic ring ligands such as boraaryl (see, e.g., U.S. Pat. No. 5,554,775), pyrrolyl, indolyl, (U.S. Pat. No. 5,539,124), or azaborolinyl groups (U.S. Pat. No. 5,902,866).

Substituted metallocenes, constrained-geometry catalysts, bridged complexes, and many heterometallocenes offer interesting advantages, including higher activity, control over polyolefin properties, and stereoregular polymers. Variety, however, comes at a price: ligands used to make many of these catalysts require costly multi-step syntheses from expensive and often hard-to-handle starting materials and reagents.

In sum, there is a continuing need for single-site catalysts that can be prepared inexpensively and in short order. In particular, there is a need for catalysts that can be tailored to have good activities and to give polyolefins with desirable physical properties.

SUMMARY OF THE INVENTION

The invention is a single-site olefin polymerization catalyst. The catalyst comprises an activator and an organometallic complex. The organometallic complex comprises a Group 3 to 10 transition or lanthanide metal, M, and at least one indenoindolyl ligand that is π-bonded to M.

The invention includes a three-step method for making the organometallic complex. First, an indanone reacts with an aryl hydrazine in the presence of a basic or acidic catalyst to produce an aryl hydrazone. Next, the aryl hydrazone is cyclized in the presence of an acidic catalyst to produce an indenoindole ligand precursor. Finally, the precursor is deprotonated, and the resulting anion reacts with a Group 3 to 10 transition or lanthanide metal source to produce the desired organometallic complex.

The invention provides a remarkably simple synthetic route to single-site olefin polymerization catalysts. Because many indanones and aryl hydrazines are commercially available or easily made, a wide variety of organometallic complexes that contain π-bonded indenoindolyl ligands can be expeditiously prepared. The ease and inherent flexibility of the synthesis puts polyolefin makers in charge of a new family of single-site catalysts.

DETAILED DESCRIPTION OF THE INVENTION

Catalysts of the invention comprise an activator and an organometallic complex. The catalysts are "single site" in nature, i.e., they are distinct chemical species rather than mixtures of different species. They typically give polyolefins with characteristically narrow molecular weight distributions (Mw/Mn<3) and good, uniform comonomer incorporation.

The organometallic complex includes a Group 3 to 10 transition or lanthanide metal, M. More preferred complexes include a Group 4 to 6 transition metal; most preferably, the complex contains a Group 4 metal such as titanium or zirconium.

The organometallic complex also comprises at least one indenoindolyl ligand that is π-bonded to M. By "indenoindole," we mean an organic compound that has both indole and indene rings. The five-membered rings from each are fused, i.e., they share two or more carbon atoms. Preferably, the rings are fused such that the indole nitrogen and the only $sp^3$-hybridized carbon on the indenyl ring are "trans" to each other. Such is the case in an indeno[3,2-b]indole ring system such as:

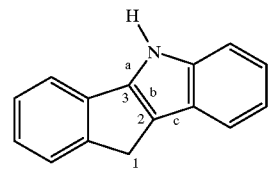

To identify how the rings are fused, the indene ring is numbered beginning with the —$CH_2$— group. The "b" side of the indole ring matches the "3,2" side of the indene. In accord with IUPAC Rule A-21.5, the order of the numbers (3,2) conforms to the direction of the base (indolyl) component (i.e., from a to b). Suitable ring systems include those in which the indole nitrogen and the $sp^3$-hybridized carbon of the indene are beta to each other, i.e., they are on the same side of the molecule. This is an indeno[2,3-b]indole ring system:

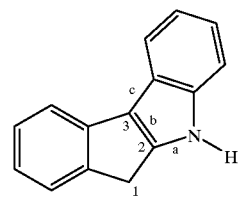

Any of the ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present. For example, a benzo ring can be fused in the "e," "f," or "g" positions of either or both of the indene and indole rings, as in a benzo[f]indeno[3,2-b]indole system:

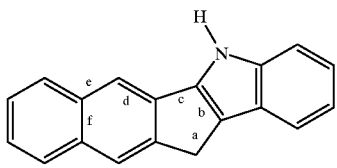

Numbering of indenoindoles follows IUPAC Rule A-22. The molecule is oriented as shown above, and numbering is done clockwise beginning with the ring at the uppermost right of the structure. Thus, 10-methyl-5H-indeno[3,2-b]indole is numbered as follows:

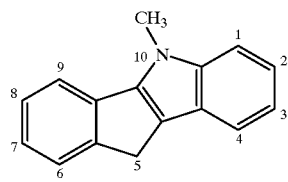

Suitable indenoindole ligand precursors include, for example, 5,10-dihydroindeno[3,2-b]indole, 4,8,10-trimethyl-5H-indeno[3,2-b]indole, 4-tert-butyl-8-methyl-5,10-dihydroindeno[3,2-b]indole, 4,8-dichloro-5,10-dihydroindeno[3,2-b]indole, 10-methylbenzo[f]-5H-indeno[3,2-b]indole, benzo[g]-5,10-dihydroindeno[3,2-b]indole, 5,10-dihydroindeno[3,2-b]benzo[e]indole, benzo[g]-5,10-dihydroindeno[3,2-b]benzo[e]indole, and the like.

The indenoindolyl ligand is generated by deprotonating a ligand precursor with a base to give an anionic ring system with a high degree of aromaticity (highly delocalized). Reaction of the anion with, e.g., a transition metal halide gives the desired organometallic complex. The indenoindolyl ligand is π-bonded to M in the complex.

The organometallic complex optionally includes one or more additional polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference. A preferred group of polymerization-stable ligands are heteroatomic ligands such as boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are incorporated herein by reference. The organometallic complex also usually includes one or more labile ligands such as halides, alkyls, alkaryls, aryls, dialkylaminos, or the like. Particularly preferred are halides, alkyls, and alkaryls (e.g., chloride, methyl, benzyl).

The indenoindolyl and/or polymerization-stable ligands can be bridged. For instance, a —CH$_2$—, —CH$_2$CH$_2$—, or (CH$_3$)$_2$Si bridge can be used to link two indenoindolyl groups through the indolyl nitrogens. Groups that can be used to bridge the ligands include, for example, methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary organometallic complexes: 10H-indeno[3,2-b]indolyl titanium trichloride, 10H-indeno[3,2-b]indolyl zirconium trichloride, bis(3,7-dimethyl-10H-indeno[3,2-b]indolyl)titanium dimethyl, (3-tert-butyl-8,10-dimethylindeno[3,2-b]indolyl)zirconium trichloride, bis(10H-indeno[3,2-b]indolyl)zirconium dichloride, (10-phenyl-benzo[g]-indeno[3,2-b]indolyl)zirconium trichloride, (cyclopentadienyl)(10H-indeno[3,2-b]indolyl) zirconium dichloride, (8-quinolinoxy)(10H-indeno[3,2-b]indolyl) titanium dichloride, (1-methylborabenzene)(10H-indeno[3,2-b]indolyl)zirconium dimethyl, ansa-methylene-N,N'-bis(10H-indeno[3,2-b]indolyl)zirconium dichloride, and the like.

The catalysts include an activator. Suitable activators ionize the organometallic complex to produce an active olefin polymerization catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

The amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

If desired, a catalyst support such as silica or alumina can be used. However, the use of a support is generally not necessary for practicing the process of the invention.

The invention includes a three-step method for making the organometallic complex. In a first step, an indanone reacts with an aryl hydrazine in the presence of a basic or acidic catalyst to produce an aryl hydrazone by a known synthetic procedure.

Indanones are bicyclic compounds that have a cyclopentanone ring fused to a benzene ring. Both rings can be unsubstituted or substituted with alkyl, aryl, aralkyl, nitro, halide, thioether, or other groups. Additional fused rings can be present as long as an indanone moiety is present. Suitable indanones include, for example, 1-indanone, 2-indanone, 6-methylindan-1-one, 5-chloroindan-1-one, 6-nitroindan-2-one, benzol[f]indan-1-one, and the like, and mixtures thereof.

Aryl hydrazines are aromatic compounds that have a hydrazine (—NHNH$_2$) group attached to an aromatic ring.

They are often used and commercially available in the form of the acid salt, as in phenyl hydrazine hydrochloride. The aromatic ring of the aryl hydrazine can be substituted with the groups described above, and it can be fused to other rings. Suitable aryl hydrazines include, for example, phenyl hydrazine, p-tolyl hydrazine, m-tolyl hydrazine, p-chlorophenyl hydrazine, 1-naphthyl hydrazine, 2-naphthyl hydrazine, and the like, and mixtures thereof.

The ability to vary the substituents on the indanone and aryl hydrazine provides catalyst makers access to a diverse array of indenoindolyl ligands. This allows them to "fine tune" the activity of the corresponding organometallic complexes and, ultimately, the physical properties of the polyolefins. Because of the unique geometries of their active sites, some of the complexes should be valuable for making stereoregular polyolefins such as isotactic or syndiotactic polypropylene.

A wide variety of well-known acidic and basic compounds catalyze the reaction between the aryl hydrazine and the indanone. Examples include hydrochloric acid, acetic acid, sulfuric acid, p-toluenesulfonic acid, ammonia, triethylamine, sodium hydroxide, potassium hydroxide, sodium methoxide, sodium acetate, and the like.

Usually, the aryl hydrazine and the indanone are simply heated together with the catalyst, often with a reaction solvent, for a time needed to give the aryl hydrazone. The reaction product can be isolated and purified by conventional means (e.g., filtration, recrystallization), but more often, the aryl hydrazone is used in the next step without purification. A typical procedure is shown in *J. Chem. Soc.* (1952) 2225.

In step two, the aryl hydrazone cyclizes in the presence of an acidic catalyst in a Fischer indole reaction with elimination of ammonia to give an indenoindole ligand precursor. The reaction apparently involves an interesting [3,3] sigmatropic rearrangement (see J. March, *Advanced Organic Chemistry*, $2^{nd}$ ed. (1977) 1054). A variety of acidic catalysts are suitable, including, for example, Lewis acids (zinc chloride, boron trifluoride), and protic acids (hydrochloric acid, acetic acid, p-toluenesulfonic acid). Usually, the crude aryl hydrazone is simply heated with the acidic catalyst for a brief period to cause the cyclization reaction. The reaction product is isolated and purified by any suitable method. In one method, the cyclization reaction mixture is poured into ice water and extracted into an organic solvent. The solution is dried, filtered, and evaporated to give the crude indenoindole ligand precursor, which can be further purified by recrystallization. In contrast to the previous step, it is preferred to purify this reaction product prior to using it in the next step.

In step three of the method, the ligand precursor is deprotonated by reacting it with at least one equivalent of a potent base such as lithium diisopropylamide, n-butyllithium, sodium hydride, a Grignard reagent, or the like. The resulting anion is reacted with a Group 3 to 10 transition or lanthanide metal source to produce an organometallic complex. The complex comprises the metal, M, and at least one indenoindolyl ligand that is π-bonded to the metal. Any convenient source of the Group 3 to 10 transition or lanthanide metal can be used. Usually, the source is a complex that contains one or more labile ligands that are easily displaced by the indenoindolyl anion. Examples are halides (e.g., $TiCl_4$, $ZrCl_4$), alkoxides, amides, and the like. The metal source can incorporate one or more of the polymerization-stable anionic ligands described earlier. The organometallic complex can be used "as is." Often, however, the complex is converted to an alkyl derivative by treating it with an alkylating agent such as methyl lithium. The alkylated complexes are more suitable for use with certain activators (e.g., ionic borates).

Step three is normally performed by first generating the indenoindolyl anion at low temperature (0° C. to −100° C.), preferably in an inert solvent (e.g., a hydrocarbon). The anion is then usually added to a solution of the transition or lanthanide metal source at low to room temperature. After the reaction is complete, by-products and solvents are removed to give the desired transition metal complex. Examples A and B below illustrate typical catalyst syntheses.

The catalysts are particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

Examples 1–9 below illustrate typical olefin polymerizations using catalysts of the invention. As the examples show, the catalysts have good activity and give polymers with favorable melt-flow properties.

The following examples merely illustrate the invention. Those skilled in the art will recognize many variations that are within the spirit of the invention and scope of the claims.

Ligand Precursor Preparation 3,10-Dimethyl-5H-indeno[3,2-b]indole, the ligand precursor for the catalysts prepared in Examples A and B, is prepared by the method of Buu-Hoi and Xuong (*J. Chem. Soc.* (1952) 2225) by reacting p-tolylhydrazine with 1-indanone in the presence of sodium acetate/ethanol, followed by reaction of the secondary amine product with MeI in the presence of a basic catalyst (NaOH or $Na_2CO_3$) to give the desired N-methylated product:

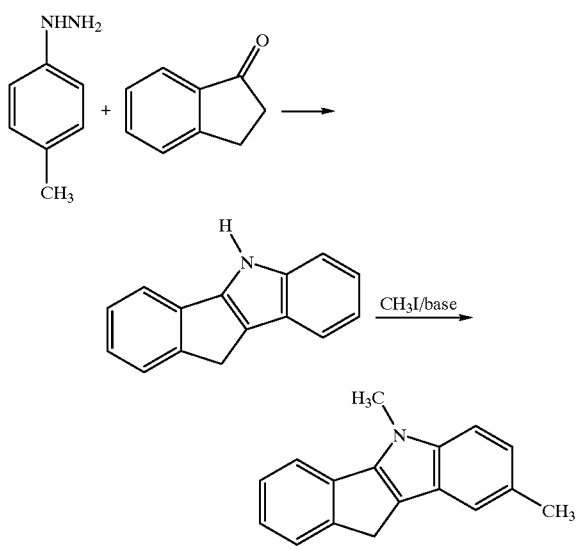

EXAMPLE A

Preparation of Catalyst A 3,1 0-Dimethyl-5H-indeno[3,2-b]indole is deprotonated with n-butyllithium in toluene. A solution of the resulting anion (1.18 g, 0.0049 mol) in tetrahydrofuran (20 mL) is added to a solution of zirconium tetrachloride (0.60 g, 0.0026 mol) in THF (40 mL) at −78° C. After stirring for 15 h at room temperature, a bright red precipitate is isolated and and vacuum dried. The resulting material (0.71 g) is used without further purification. The principal catalyst component is bis(3,10-dimethylindeno[3,2-b]indolyl)zirconium dichloride:

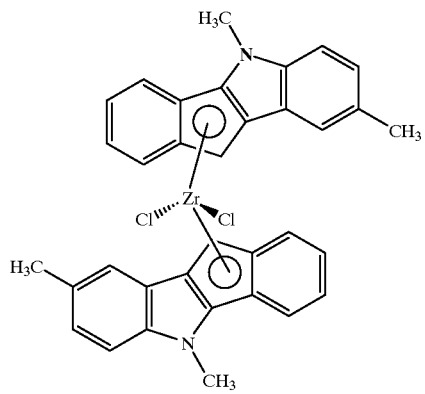

EXAMPLE B

Preparation of Catalyst B 3,10-Dimethyl-5H-indeno[3,2-b]indole is deprotonated with n-butyllithium in diethyl ether. The resulting anionic complex (2.2 g, 0.0703 mol) is dissolved in diethyl ether (50 mL). Zirconium tetrachloride (0.819 g, 0.00352 mol) is added to the anion at −78° C. The reaction mixture is stirred for 15 h at room temperature, and solvent is removed under vacuum to obtain a red catalyst sample that is used without further purification. The principal catalyst component is bis(3,10-dimethylindeno[3,2-b]indolyl)zirconium dichloride.

EXAMPLES 1–9

Ethylene Polymerization—General Procedure

Slurry polymerizations are performed in a 1.7-L, stainless-steel stirred reactor. Dry, oxygen-free toluene (850 mL) is charged to the clean, dry, oxygen-free reactor at room temperature. The activator used in each polymerization is a solution of 10 wt. % methalumoxane (MAO) in toluene (from Ethyl Corporation). The specified amounts (from Table 1 below) of MAO, 1-butene (comonomer), and hydrogen are then added, in that order, to the reactor. The reactor is heated to the desired reaction temperature and allowed to equilibrate. Ethylene is introduced to give a total pressure in the reactor of 150 psig, and the reactor is again allowed to equilibrate. The desired quantity of catalyst, dissolved in toluene, is then injected into the reactor to start the polymerization. Ethylene is fed on demand to keep the reactor pressure at 150 psig. At the end of 1 h, the ethylene flow is stopped, and the reaction mixture cools to room temperature. The polymer is isolated by vacuum filtration, is dried overnight in a vacuum oven, and is weighed and characterized. Table 1 gives polymerization conditions; Table 2 gives polymer properties.

Example 3 uses a slightly modified procedure: Half of the MAO is added as described above, while the other half is mixed with the organometallic complex and allowed to react for 15 min. prior to injecting the catalyst mixture into the reactor.

The melt index of the polymer is measured using ASTM D-1238, Conditions E and F. MI2 is the melt index measured with a 2.16 kg weight (Condition E). MI20 is the melt index measured with a 21.6 kg weight (Condition F). MFR is the ratio of MI20 to MI2. Densities are measured in using ASTM D-1505.

Table 1 summarizes process conditions and Table 2 gives polymer properties for the examples.

The preceding examples are meant only as illustrations. The following claims define the invention.

TABLE 1

Polymerization Conditions

| Ex. # | Catalyst ID | Amt. (mmoles) | MAO (mmoles) | Temp. (° C.) | 1-butene (mL) | Hydrogen (mmoles) |
|---|---|---|---|---|---|---|
| 1 | A | $8.0 \times 10^{-4}$ | 9.0 | 80 | 0 | 0 |
| 2 | A | $3.2 \times 10^{-3}$ | 9.0 | 80 | 0 | 0 |
| 3 | A | $3.2 \times 10^{-3}$ | 9.0 | 80 | 0 | 0 |
| 4 | A | $3.2 \times 10^{-3}$ | 9.0 | 110 | 0 | 0 |
| 5 | A | $8.0 \times 10^{-3}$ | 9.0 | 80 | 0 | 0 |
| 6 | A | $8.0 \times 10^{-3}$ | 9.0 | 110 | 0 | 60 |
| 7 | A | $8.0 \times 10^{-3}$ | 9.0 | 110 | 20 | 60 |
| 8 | A | $3.2 \times 10^{-3}$ | 6.0 | 80 | 0 | 0 |
| 9 | B | $8.0 \times 10^{-3}$ | 9.0 | 80 | 0 | 0 |

Catalyst A, B = bis(3,10-dimethylindeno[3,2-b]indolyl)zirconium dichloride;
MAO = methalumoxane

TABLE 2

Polymerization Results

| Ex. # | Catalyst ID | Polymer wt. (g) | Productivity (kg/g Zr) | MI$_2$ (dg/min) | MI$_{20}$ (dg/min) | Density (g/mL) |
|---|---|---|---|---|---|---|
| 1 | A | 4.8 | 65.8 | — | — | — |
| 2 | A | 29.0 | 99.4 | 0.048 | 1.41 | 0.963 |
| 3 | A | 21.6 | 74.0 | 0.028 | 0.63 | — |

TABLE 2-continued

Polymerization Results

| Ex. # | Catalyst ID | Polymer wt. (g) | Productivity (kg/g Zr) | MI$_2$ (dg/min) | MI$_{20}$ (dg/min) | Density (g/mL) |
|---|---|---|---|---|---|---|
| 4 | A | 9.4 | 32.3 | 1.32 | 7.98 | — |
| 5 | A | 49.9 | 68.4 | 0.62 | 16.6 | 0.967 |
| 6 | A | 36.6 | 50.2 | 1092 | — | >0.970 |
| 7 | A | 33.5 | 45.9 | 2075 | — | 0.973 |
| 8 | A | 19.0 | 65.1 | 0.023 | 0.30 | — |
| 9 | B | 31.8 | 43.6 | 0.034 | 1.27 | — |

Catalyst A, B = bis(3,10-dimethylindeno[3,2-b]indolyl)zirconium dichloride;
MAO = methalumoxane

We claim:

1. A catalyst which comprises:
   (a) an activator; and
   (b) an organometallic complex comprising a Group 3 to 10 transition or lanthanide metal, M, and at least one indenoindolyl ligand that is π-bonded to M.

2. The catalyst of claim 1 wherein the activator is selected from the group consisting of alumoxanes, alkylaluminum compounds, organoboranes, ionic borates, and ionic aluminates.

3. The catalyst of claim 1 comprising a Group 4 transition metal.

4. The catalyst of claim 1 further comprising a substituted or unsubstituted cyclopentadienyl, indenyl, or fluorenyl group.

5. The catalyst of claim 1 wherein the organometallic complex further comprises a polymerization-stable, anionic ligand selected from the group consisting of boraaryl, pyrrolyl, indolyl, quinolinyl, pyridinyl, and azaborolinyl.

6. The catalyst of claim 1 wherein the indenoindolyl ligand is bridged to another ligand.

7. The catalyst of claim 1 wherein the indenoindolyl ligand has the general structure:

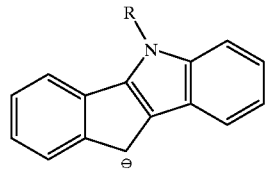

in which each ring atom is unsubstituted or substituted with one or more alkyl, aryl, aralkyl, halogen, silyl, nitro, dialkylamino, diarylamino, alkoxy, aryloxy, or thioether groups.

* * * * *